US011901105B2

(12) United States Patent
Hiraki et al.

(10) Patent No.: US 11,901,105 B2
(45) Date of Patent: Feb. 13, 2024

(54) MULTILAYER COIL COMPONENT

(71) Applicant: Murata Manufacturing Co., Ltd., Kyoto-fu (JP)

(72) Inventors: Makoto Hiraki, Nagaokakyo (JP); Katsuhisa Imada, Nagaokakyo (JP); Morihiro Hamano, Nagaokakyo (JP); Ryouji Mizobata, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 340 days.

(21) Appl. No.: 17/169,131

(22) Filed: Feb. 5, 2021

(65) Prior Publication Data

US 2021/0249172 A1 Aug. 12, 2021

(30) Foreign Application Priority Data

Feb. 6, 2020 (JP) ................................ 2020-018936

(51) Int. Cl.

| | |
|---|---|
| ***H01F 27/28*** | (2006.01) |
| ***H01F 17/00*** | (2006.01) |
| ***H01F 27/255*** | (2006.01) |
| ***H01F 27/32*** | (2006.01) |
| ***H01F 41/04*** | (2006.01) |

(52) U.S. Cl.

CPC ....... *H01F 17/0013* (2013.01); *H01F 27/255* (2013.01); *H01F 27/2804* (2013.01); *H01F 27/32* (2013.01); *H01F 41/046* (2013.01); *H01F 2027/2809* (2013.01)

(58) Field of Classification Search

CPC ............... H01F 17/0013; H01F 27/255; H01F 27/2804; H01F 27/32; H01F 2027/2809; H01F 41/043; H01F 41/06; H01F 27/28

USPC ........................................ 336/200, 232, 192

See application file for complete search history.

(56) References Cited

U.S. PATENT DOCUMENTS

2011/0037557 A1* 2/2011 Konoue .................. H01F 27/34 336/200
2011/0141660 A1* 6/2011 Jeong ....................... H01G 4/12 361/321.2

(Continued)

FOREIGN PATENT DOCUMENTS

JP 2017-059749 A 3/2017
JP 2018-011014 A 1/2018
JP 2019-125607 A 7/2019

*Primary Examiner* — Shawki S Ismail
*Assistant Examiner* — Kazi S Hossain
(74) *Attorney, Agent, or Firm* — Studebaker & Brackett PC

(57) ABSTRACT

A highly reliable multilayer coil component in which the internal stress is further alleviated, and a method for producing the same. The method produces a multilayer coil component that includes an insulator portion, a coil that is embedded in the insulator portion and includes a plurality of coil conductor layers electrically connected to one another, and an outer electrode that is disposed on a surface of the insulator portion and is electrically connected to an extended portion of the coil. The method includes forming a conductive paste layer by using a conductive paste; forming an insulating paste layer by using an insulating paste; forming a multilayer compact that includes the conductive paste layer and the insulating paste layer; and firing the multilayer compact, in which the conductive paste has a PVC of 60% or more and 80% or less (i.e., from 60% to 80%).

9 Claims, 6 Drawing Sheets

(56) References Cited

U.S. PATENT DOCUMENTS

| | | | | |
|---|---|---|---|---|
| 2012/0326827 | A1* | 12/2012 | Nanjyo | H01F 17/0033 336/200 |
| 2014/0085037 | A1* | 3/2014 | Shin | H01F 41/046 156/89.12 |
| 2019/0214187 | A1* | 7/2019 | Imada | H01F 41/043 |
| 2020/0251273 | A1* | 8/2020 | Takai | H01F 17/0013 |

* cited by examiner

MULTILAYER COIL COMPONENT

CROSS-REFERENCE TO RELATED APPLICATION

This application claims benefit of priority to Japanese Patent Application No. 2020-018936, filed Feb. 6, 2020, the entire content of which is incorporated herein by reference.

BACKGROUND

Technical Field

The present disclosure relates to a multilayer coil component and a method for producing the same.

Background Art

A method for producing a multilayer coil component, the method involving stacking coil conductor layers on magnetic body layers to obtain a multilayer compact and firing the multilayer compact is known (Japanese Unexamined Patent Application Publication No. 2018-11014).

When producing a multilayer coil component, the magnetic body layers and the coil conductor layers exhibit different shrinkage ratios during firing, and internal stress can occur due to the difference in the shrinkage ratio. In Japanese Unexamined Patent Application Publication No. 2018-11014, a void portion is provided on top of a coil conductor layer to alleviate the internal stress; however, since the coil conductor layer has a portion in contact with the magnetic body layer, the internal stress can still occur in this portion.

SUMMARY

The present disclosure provides a highly reliable multilayer coil component in which the internal stress is further alleviated, and a method for producing the same.

The present disclosure includes the following embodiments.

[1] A method for producing a multilayer coil component that includes an insulator portion, a coil that is embedded in the insulator portion and includes a plurality of coil conductor layers electrically connected to one another, and outer electrodes that are disposed on surfaces of the insulator portion and are electrically connected to extended portions of the coil, the method including: forming a conductive paste layer by using a conductive paste; forming an insulating paste layer by using an insulating paste; forming a multilayer compact that includes the conductive paste layer and the insulating paste layer; and firing the multilayer compact, in which the conductive paste has a PVC of 60% or more and 80% or less (i.e., from 60% to 80%).

[2] The method described in [1] includes preparing an insulating sheet; forming a resin paste layer on the insulating sheet by using a resin paste; forming a conductive paste layer on the resin paste layer by using a conductive paste; forming an insulating paste layer on the insulating sheet by using an insulating paste such that at least part of an upper surface of the conductive paste layer is exposed; stacking a plurality of the insulating sheets having the resin paste layer, the conductive paste layer, and the insulating paste layer formed thereon to form a multilayer compact; and firing the multilayer compact.

[3] In the method described in [1] or [2], the conductive paste may be a silver paste.

[4] The method described in any one of [1] to [3] may include forming second conductive paste layers by using a second conductive paste having a PVC greater than that of the conductive paste, the second conductive paste layers overlapping portions of the conductive paste layers corresponding to the extended portions.

[5] A multilayer coil component including an insulator portion; a coil that is embedded in the insulator portion and includes a plurality of coil conductor layers electrically connected to one another; and outer electrodes that are disposed on surfaces of the insulator portion and are electrically connected to extended portions of the coil, in which the coil conductor layers have a pore area ratio of 5% or more and 15% or less (i.e., from 5% to 15%).

[6] In the multilayer coil component described in [5], the coil conductor layers may have an average pore diameter of 0.1 μm or more and 6.0 μm or less (i.e., from 0.1 μm to 6.0 μm).

[7] In the multilayer coil component described in [5] or [6], the coil may have the extended portions and is electrically connected to the outer electrodes through the extended portions, and the extended portions include low pore area ratio layers that have a smaller pore area ratio than the coil conductor layers.

[8] In the multilayer coil component described in any one of [5] to [7], the low pore area ratio layers may have a pore area ratio of 1.0% or more and 4.0% or less (i.e., from 1.0% to 4.0%).

[9] In the multilayer coil component described in any one of [5] to [8], a void portion may be formed between each of the coil conductor layers and the insulator portion.

[10] In the multilayer coil component described in [9], in a cross section perpendicular to a coil winding direction, the void portion may have one surface in contact with the insulator portion and the rest in contact with the coil conductor layer.

The method for producing a multilayer coil component of the present disclosure can suppress occurrence of internal stress by generating pores in the inside of the coil conductor layers during firing. Thus, a highly reliable multilayer coil component can be provided.

Other features, elements, characteristics and advantages of the present disclosure will become more apparent from the following detailed description of preferred embodiments of the present disclosure with reference to the attached drawings.

DETAILED DESCRIPTION

Figure 1:
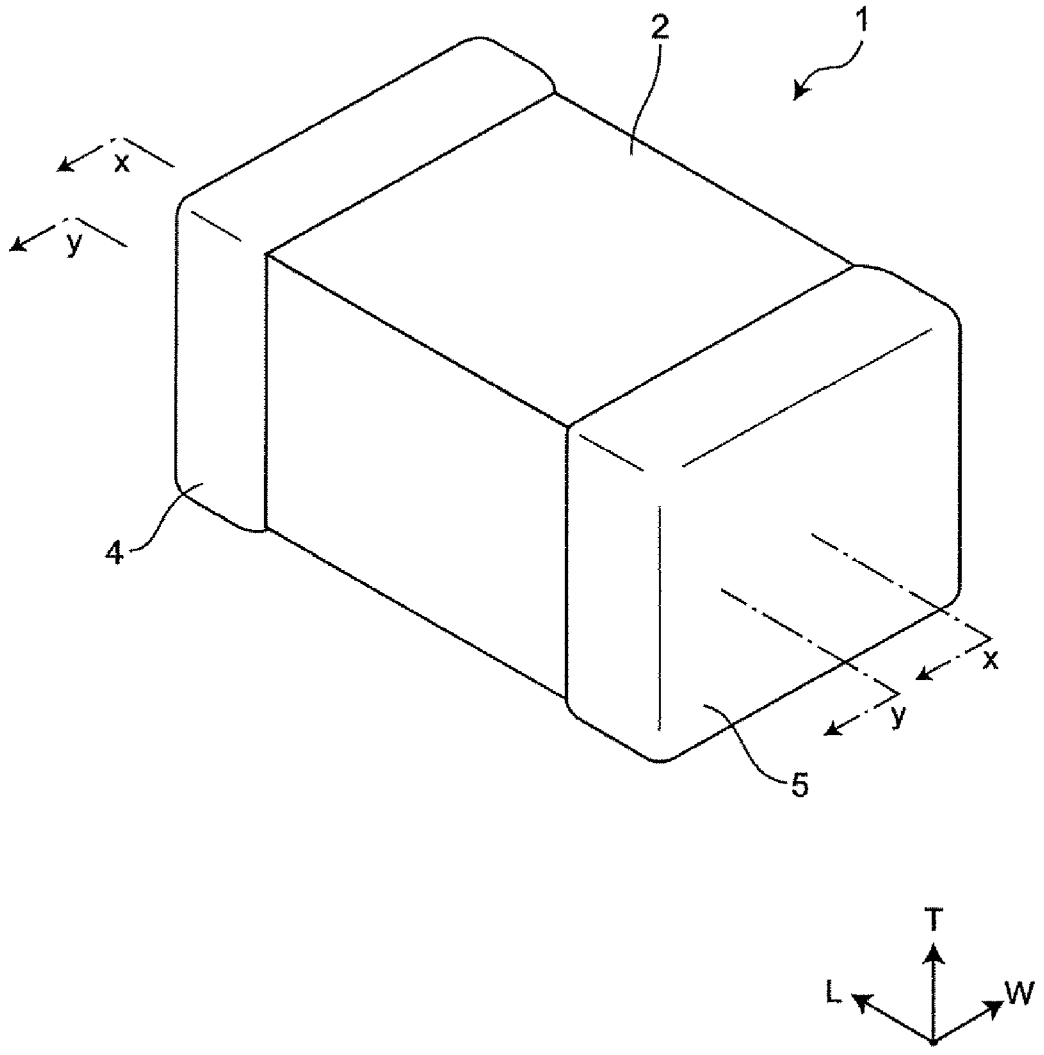
FIG. 1 is a schematic perspective view of a multilayer coil component 1 of the present disclosure.

The present disclosure will now be described in detail by referring to the drawings. The shape, arrangement, and other features of the multilayer coil component of this embodiment and respective constituent elements thereof are not limited by the examples illustrated in the drawings.

Figure 2:
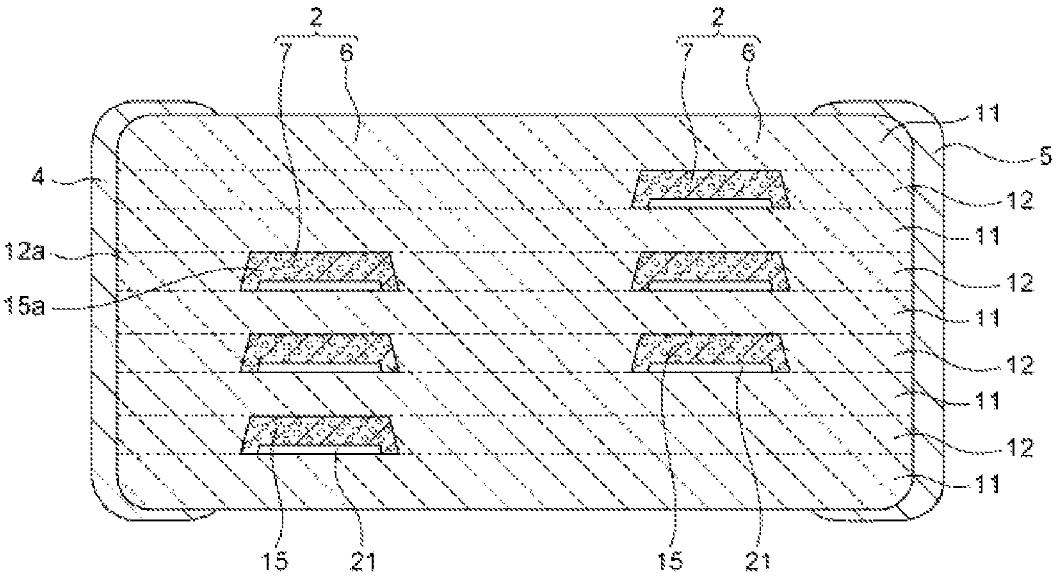
FIG. 2 is a cross-sectional view of the multilayer coil component 1 illustrated in FIG. 1 taken along line x-x.
Figure 3:
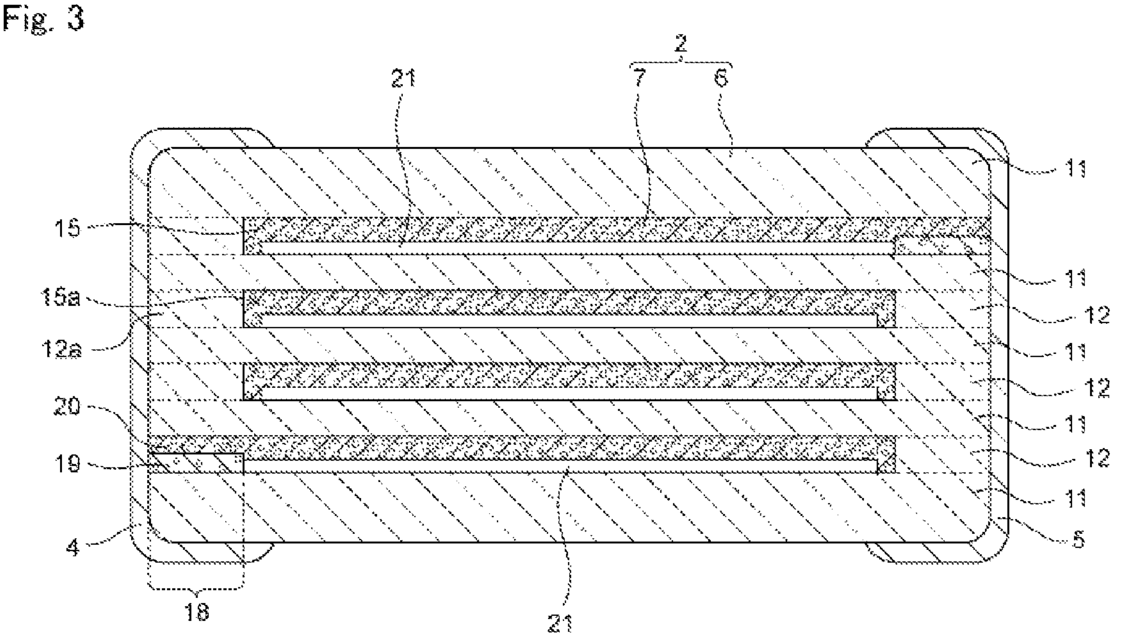
FIG. 3 is a cross-sectional view of the multilayer coil component 1 illustrated in FIG. 1 taken along line y-y.

FIG. 1 is a perspective view of a multilayer coil component 1 of this embodiment, FIG. 2 is a cross-sectional view taken along line x-x, and FIG. 3 is a cross-sectional view taken along line y-y. However, the shape, arrangement, and other features of the multilayer coil component of this embodiment and respective constituent elements thereof described below are not limited by the examples illustrated in the drawings.

As illustrated in FIGS. 1 to 3, the multilayer coil component 1 of this embodiment has a substantially rectangular parallelepiped shape. In the multilayer coil component 1, surfaces perpendicular to an L axis in FIG. 1 are referred to as "end surfaces", surfaces perpendicular to a W axis are referred to as "side surfaces", and surfaces perpendicular to a T axis are referred to as an "upper surface" and a "lower surface". The multilayer coil component 1 schematically includes an element body 2 and outer electrodes 4 and 5 respectively disposed on two end surfaces of the element body 2. The element body 2 includes an insulator portion 6 and a coil 7 embedded in the insulator portion 6. The insulator portion 6 includes first insulator layers 11 and second insulator layers 12. The coil 7 is constituted by coil conductor layers 15 that are connected into a coil shape by via conductors (not illustrated in the drawings) that penetrate through the first insulator layers 11. The coil 7 has two extended portions 18 respectively at two ends thereof, and is connected to the outer electrodes 4 and 5 via these extended portions. A void portion 21 is provided between the insulator portion 6 and a main surface (lower main surface in FIGS. 2 and 3) of the coil conductor layer 15, in other words, between the first insulator layer 11 and the coil conductor layer 15.

A method for producing the multilayer coil component 1 of the embodiment described above will now be described. In this embodiment, an example in which the insulator portion 6 is formed from a ferrite material is described.

(1) Preparation of Ferrite Paste

First, a ferrite material is prepared. The ferrite material contains, as main components, Fe, Zn, and Ni, and, if desired, Cu. Typically, the main components of the ferrite material are practically oxides of Fe, Zn, Ni, and Cu (ideally, $Fe_2O_3$, ZnO, NiO, and CuO).

To prepare the ferrite material, $Fe_2O_3$, ZnO, CuO, NiO, and, if needed, additive components are weighed to obtain a particular composition, and then mixed and pulverized. The pulverized ferrite material is dried and calcined at, for example, a temperature of about 700° C. to about 800° C. so as to obtain a calcined powder. To this calcined powder, particular amounts of a solvent (ketone solvent or the like), a resin (polyvinyl acetal or the like), and a plasticizer (alkyd plasticizer or the like) are added, the resulting mixture is kneaded in a planetary mixer or the like, and the kneaded mixture is dispersed with a three-roll mill or the like to prepare a ferrite paste.

(2) Preparation of Ferrite Sheets

Next, to a calcined powder of a ferrite material obtained in the same manner as that described above, an organic binder such as a polyvinyl butyral binder, and organic solvents such as ethanol and toluene are added, and the resulting mixture is put in a pot mill along with PSZ balls to be mixed and pulverized. The obtained mixture is then formed into sheets having particular thickness, size, and shape by a doctor blade method or the like. As a result, ferrite sheets can be prepared.

In the ferrite material described above, the Fe content based on $Fe_2O_3$ is preferably about 40.0 mol % or more and about 49.5 mol % or less (i.e., from about 40.0 mol % to about 49.5 mol %) (with reference to the total of main components, the same applies hereinafter), and is more preferably about 45.0 mol % or more and about 49.5 mol % or less (i.e., from about 45.0 mol % to about 49.5 mol %).

In the ferrite material described above, the Zn content based on ZnO is preferably about 5.0 mol % or more and about 35.0 mol % or less (i.e., from about 5.0 mol % to about 35.0 mol %) (with reference to the total of main components, the same applies hereinafter), and is more preferably about 10.0 mol % or more and about 30.0 mol % or less (i.e., from about 10.0 mol % to about 30.0 mol %).

In the ferrite material described above, the Cu content based on CuO is preferably about 4.0 mol % or more and about 12.0 mol % or less (i.e., from about 4.0 mol % to about 12.0 mol %) (with reference to the total of main components, the same applies hereinafter), and is more preferably about 7.0 mol % or more and about 10.0 mol % or less (i.e., from about 7.0 mol % to about 10.0 mol %).

The Ni content in the ferrite material described above is not particularly limited, and can be the balance of the aforementioned other main components, Fe, Zn, and Cu.

In one embodiment, the ferrite material contains about 40.0 mol % or more and about 49.5 mol % or less of Fe (i.e., from about 40.0 mol % to about 49.5 mol %) based on $Fe_2O_3$, about 5.0 mol % or more and about 35.0 mol % or less of Zn (i.e., from about 5.0 mol % to about 35.0 mol %) based on ZnO, about 4.0 mol % or more and about 12.0 mol % of Cu (i.e., from about 4.0 mol % to about 12.0 mol %) based on CuO, and the balance being NiO.

In the present disclosure, the ferrite material may further contain additive components. Examples of the additive components for the ferrite material include, but are not limited to, Mn, Co, Sn, Bi, and Si. The Mn, Co, Sn, Bi, and Si contents (added amounts) respectively based on $Mn_3O_4$, $Co_3O_4$, $SnO_2$, $Bi_2O_3$, and $SiO_2$ with respect to a total of 100 parts by weight of the main components (Fe (based on $Fe_2O_3$), Zn (based on ZnO), Cu (based on CuO), and Ni (based on NiO)) are each preferably 0.1 parts by weight or more and 1 part by weight or less (i.e., from 0.1 parts by weight to 1 part by weight). The ferrite material may further contain impurities that are unavoidable during the production.

The Fe content (based on $Fe_2O_3$), the Mn content (based on $Mn_2O_3$), the Cu content (based on CuO), the Zn content (based on ZnO), and the Ni content (based on NiO) in the sintered ferrite may be considered to be substantially the same as the Fe content (based on $Fe_2O_3$), the Mn content (based on $Mn_2O_3$), the Cu content (based on CuO), the Zn content (based on ZnO), and the Ni content (based on NiO) in the ferrite material before firing.

(3) Preparation of Conductive Paste for Coil Conductor

First, a conductive material is prepared. Examples of the conductive material include Au, Ag, Cu, Pd, and Ni, of which Ag or Cu is preferable and Ag is more preferable. A particular amount of a powder of the conductive material is weighed and kneaded along with particular amounts of a solvent (such as eugenol), a resin (such as ethyl cellulose), and a dispersant in a planetary mixer or the like, and then the resulting mixture is dispersed in a three-roll mill or the like. As a result, a conductive paste for the coil conductor can be prepared.

When preparing the conductive paste described above, the pigment volume concentration (PVC) which is the concentration of the volume of the conductive material relative to the total volume of the conductive material (typically, a silver powder) and the resin component in the conductive paste is adjusted so as to prepare two types of conductive pastes (first conductive paste and second conductive paste) that exhibit different shrinkage ratios when fired (hereinafter, these shrinkage ratios are referred to as "firing shrinkage ratios").

The firing shrinkage ratio of the first conductive paste is preferably about 15% or more and about 20% or less (i.e., from about 15% to about 20%).

The firing shrinkage ratio of the second conductive paste is smaller than that of the first conductive paste, and is preferably about 5% or more and about 15% or less (i.e., from about 5% to about 15%).

The PVC of the first conductive paste is preferably about 60% or more and about 80% or less (i.e., from about 60% to about 80%).

The PVC of the second conductive paste is greater than the PVC of the first conductive paste, and is preferably about 80% or more and about 90% or less (i.e., from about 80% to about 90%).

Here, the shrinkage ratio can be determined by applying the conductive paste to a polyethylene terephthalate (PET) film, drying the applied paste, cutting the dried paste into a size of about 5 mm×5 mm, and then measuring the change in dimension of the resulting sample by using a thermomechanical analyzer (TMA).

The PVC can be determined by measuring the weight ratio between the conductive material and the resin component by thermogravimetry (TG) and then determining the PVC from the densities of the conductive material and the resin component.

(4) Preparation of Resin Paste

A resin paste for forming void portions in the multilayer coil component 1 is prepared. The resin paste can be prepared by adding, to a solvent (such as isophorone), a resin (such as an acrylic resin) that disappears when fired.

(5) Preparation of Multilayer Coil Component (5-1) Preparation of Element Body

Figures 4A, 4B, 4C, 4D, 4E:
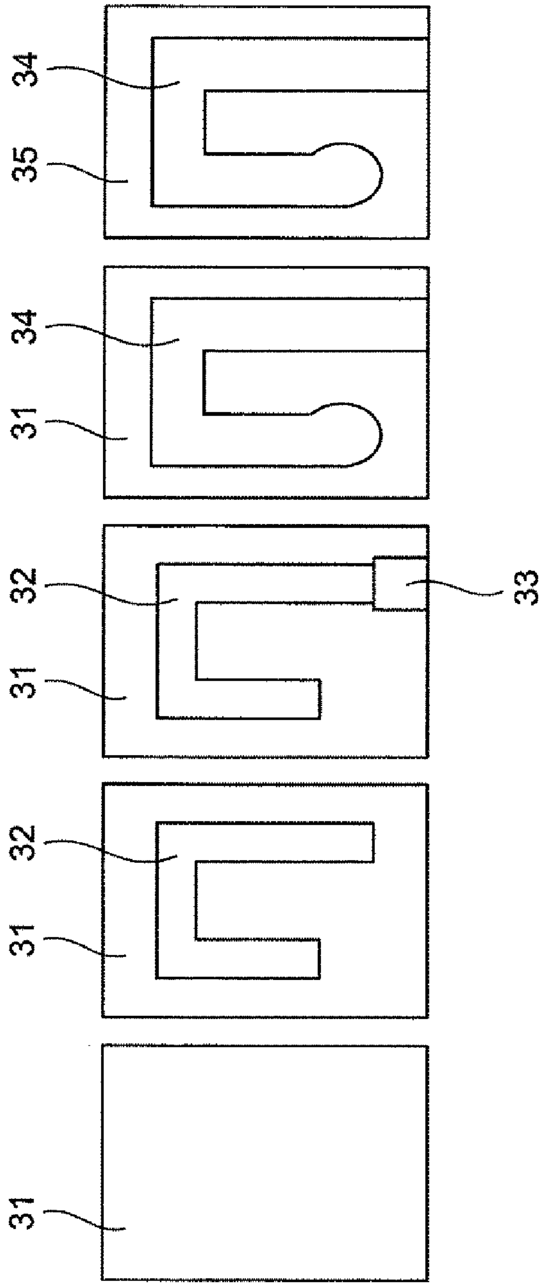
FIGS. 4A to 4E are diagrams illustrating a method for producing the multilayer coil component 1 illustrated in FIG. 1.

First, a ferrite sheet 31 is prepared (FIG. 4A). FIGS. 4A to 4E are plan views of a ferrite sheet as viewed from above.

Next, the resin paste is applied by printing to a portion where the void portion 21 is to be formed (in other words, a portion where the coil conductor layer is to be formed except for portions where the extended portion and the via are to be formed) so as to form a resin paste layer 32 (FIG. 4B).

Next, the second conductive paste is applied by printing to a portion where the extended portion is to be formed so as to form a second conductive paste layer 33 (FIG. 4C).

Next, the first conductive paste is applied by printing to the entirety of the portion where the coil conductor layer 15 is to be formed so as to form a first conductive paste layer 34 (FIG. 4D).

Next, the ferrite paste described above is applied by printing to the region where the first conductive paste layer 34 is not formed so that the applied ferrite paste has the same height as the first conductive paste layer 34, thereby forming a ferrite paste layer 35 (FIG. 4E).

A first pattern sheet is formed by the aforementioned process.

Figure 5D:
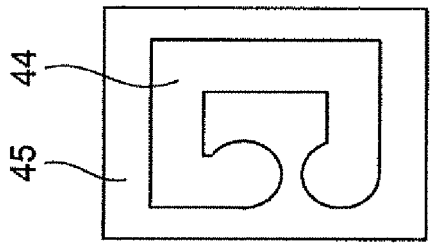
FIGS. 5A to 5D are diagrams illustrating the method for producing the multilayer coil component 1 illustrated in FIG. 1.
Figure 5C:
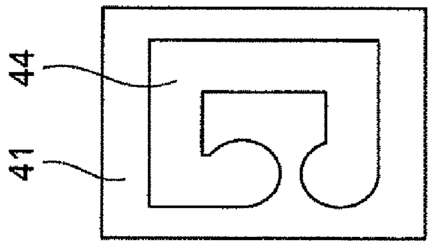

Another ferrite sheet 41 is separately prepared. A via hole 42 is formed in a particular portion of the ferrite sheet 41 (FIG. 5A).

Figure 5B:
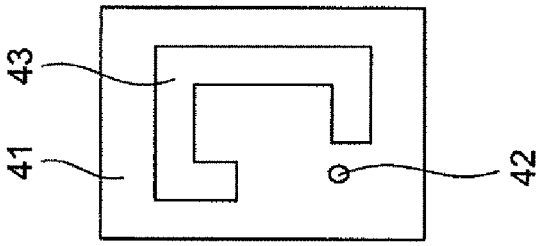
Figure 5A:
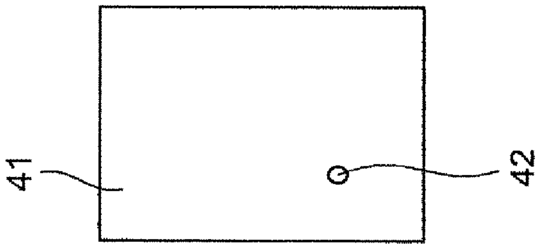
Figure 6A:
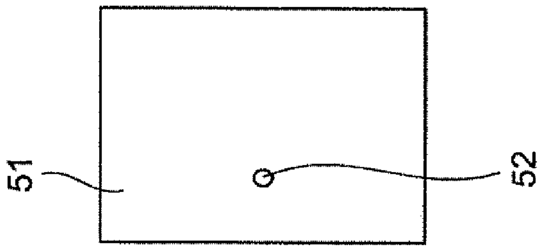
FIGS. 6A to 6D are diagrams illustrating a method for producing the multilayer coil component 1 illustrated in FIG. 1.
Figure 6B:
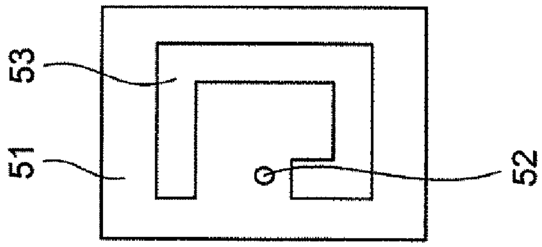
Figure 6C:
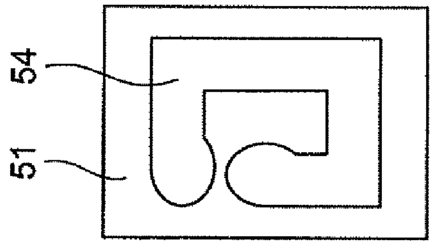
Figure 6D:
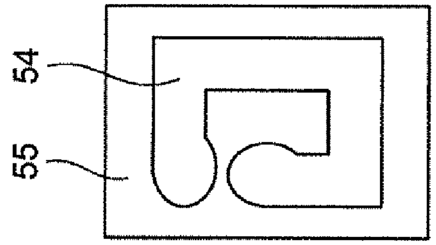
Figure 7A:
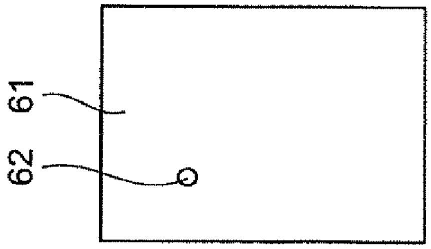
FIGS. 7A to 7E are diagrams illustrating the method for producing the multilayer coil component 1 illustrated in FIG. 1.
Figure 7B:
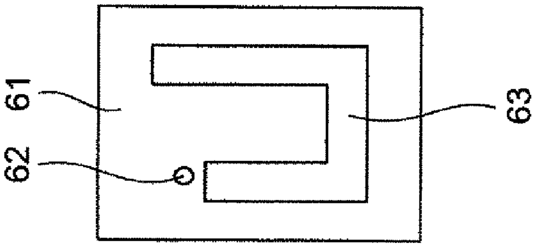
Figure 7C:
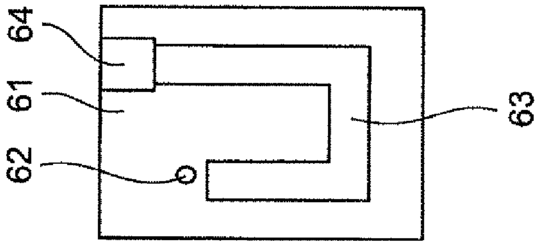
Figure 7D:
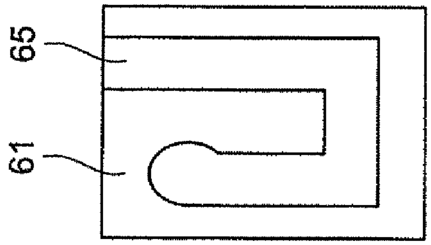
Figure 7E:
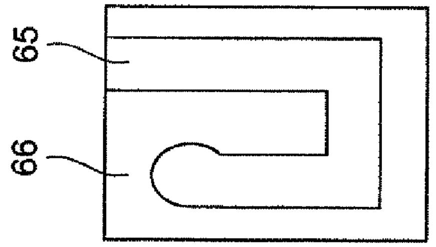

Next, the resin paste is applied by printing to a portion where the void portion 21 is to be formed so as to form a resin paste layer 43 (FIG. 5B).

Next, the first conductive paste is applied by printing to the entirety of the portion where the coil conductor layer is to be formed so as to form a first conductive paste layer 44 (FIG. 5C).

Next, the ferrite paste described above is applied by printing to the region where the first conductive paste layer 44 is not formed so that the applied ferrite paste has the same height as the first conductive paste layer 44, thereby forming a ferrite paste layer 45 (FIG. 5D).

A second pattern sheet is formed by the aforementioned process.

Another ferrite sheet 51 is prepared separately, and, as with the pattern sheet described above, a via hole 52, a resin paste layer 53, a first conductive paste layer 54, and a ferrite paste layer 55 are formed to obtain a third pattern sheet (FIGS. 6A to 6D).

Another ferrite sheet 61 is prepared separately, and, as with the pattern sheet described above, a via hole 62, a resin paste layer 63, a second conductive paste layer 64, a first conductive paste layer 65, and a ferrite paste layer 66 are formed to obtain a fourth pattern sheet (FIGS. 7A to 7E).

The first to fourth pattern sheets prepared as such are stacked on top of each other in this order to form a stack, two ferrite sheets with nothing printed thereon are respectively placed on the top and the bottom of the stack, and the resulting stack is thermally pressure-bonded to form a multilayer body block. The multilayer body block is cut by using a dicer or the like to obtain individual pieces.

The obtained element is subjected to a barrel process to round the corners of the element. The barrel process may be performed on a green multilayer body or a fired multilayer body. The barrel process may be a dry process or a wet process. The barrel process may involve scrubbing the elements against each other or performing the barrel process along with media.

After the barrel process, for example, the element is fired at a temperature of about 880° C. or higher and about 920° C. or lower (i.e., from about 880° C. to about 920° C.) to obtain an element body 2 of the multilayer coil component 1. As a result of firing, the resin paste layer disappears and the void portion 21 is formed. In addition, as a result of firing, the first conductive paste layer shrinks, and pores are generated inside the coil conductor. These pores alleviate stress caused by the difference in shrinkage ratio between the conductive paste and the ferrite sheet or paste, and suppress defects such as cracking.

(5-2) Formation of Outer Electrodes

Next, an outer electrode-forming Ag paste containing Ag and glass is applied to the end surfaces of the element body 2 and baked to form base electrodes. Next, a Ni coating and a Sn coating are sequentially formed on each of the base electrodes by electrolytic plating to form outer electrodes. As a result, a multilayer coil component 1 as illustrated in FIG. 1 is obtained.

The present disclosure provides the aforementioned production method, specifically, a method for producing a multilayer coil component that includes an insulator portion, a coil that is embedded in the insulator portion and includes a plurality of coil conductor layers electrically connected to one another, and outer electrodes that are disposed on surfaces of the insulator portion and are electrically connected to extended portions of the coil, the method including forming a conductive paste layer by using a conductive paste; forming an insulating paste layer by using an insulating paste; forming a multilayer compact that includes the conductive paste layer and the insulating paste layer; and firing the multilayer compact, in which the conductive paste has a PVC of about 60% or more and about 80% or less (i.e., from about 60% to about 80%).

In a preferred embodiment, the present disclosure provides the aforementioned method for producing a multilayer coil component, the method including preparing an insulating sheet; forming a resin paste layer on the insulating sheet by using a resin paste; forming a conductive paste layer on the resin paste layer by using a conductive paste; forming an insulating paste layer on the insulating sheet by using an insulating paste such that at least part of an upper surface of the conductive paste layer is exposed; stacking a plurality of the insulating sheets having the resin paste layer, the conductive paste layer, and the insulating paste layer formed thereon to form a multilayer compact; and firing the multilayer compact.

One embodiment of the present disclosure has been described heretofore, but this embodiment is subject to various modifications.

For example, in the description above, ferrite sheets corresponding to the respective insulating layers are prepared, printing is performed on these sheets to form coil patterns, and the element is obtained by pressure-bonding these sheets; alternatively, the element may be obtained by forming all of the layers by printing sequentially.

The multilayer coil component produced by the method of the present disclosure described above rarely has defects such as cracking during production.

Thus, the present disclosure also provides a multilayer coil component obtained by the production method described above.

Specifically, the present disclosure provides a multilayer coil component including an insulator portion; a coil that is embedded in the insulator portion and includes a plurality of coil conductor layers electrically connected to one another; and outer electrodes that are disposed on surfaces of the insulator portion and are electrically connected to extended portions of the coil, in which the coil conductor layers have a pore area ratio of about 5% or more and about 15% or less (i.e., from about 5% to about 15%).

The element body 2 of the multilayer coil component 1 of this embodiment includes the insulator portion 6 and the coil 7.

The insulator portion 6 can include the first insulator layers 11 and the second insulator layers 12.

The first insulator layers 11 are each disposed between two coil conductor layers 15 that are adjacent to each other in the stacking direction or between the coil conductor layer 15 and the upper or lower surface of the element body.

Each of the second insulator layers 12 is disposed around the coil conductor layer 15 so as to expose the upper surface (the upper main surface in FIGS. 2 and 3) of the coil conductor layer 15. In other words, the second insulator layer 12 forms a layer that lies at the same height as the coil conductor layer 15 in the stacking direction. For example, in FIG. 2, a second insulator layer 12*a* is positioned at the same height as the coil conductor layer 15*a* in the stacking direction.

In one embodiment, the second insulator layer 12 may have a portion that extends over an outer peripheral portion of the coil conductor layer 15. In other words, the second insulator layer 12 may have a portion that covers the outer peripheral portion of the coil conductor layer 15. In other words, the second insulator layer 12 can extend to the inner side of the outer edge of the coil conductor layer 15 when one coil conductor layer 15 and one second insulator layer 12 are viewed in plan from above.

The first insulator layers 11 and the second insulator layers 12 in the element body 2 may be monolithic. In such a case, the respective second insulator layers 12 can be considered to be present at the same height as the coil conductor layers 15.

The insulator portion 6 is preferably formed of a magnetic body and is more preferably formed of sintered ferrite. The sintered ferrite contains, as main components, at least Fe, Ni, and Zn. The sintered ferrite may further contain Cu.

The first insulator layers 11 and the second insulator layers 12 may have the same composition or different compositions. In a preferred embodiment, the first insulator layers 11 and the second insulator layers 12 have the same composition.

In one embodiment, the sintered ferrite contains, as main components, at least Fe, Ni, Zn, and Cu.

In the sintered ferrite described above, the Fe content based on $Fe_2O_3$ is preferably about 40.0 mol % or more and about 49.5 mol % or less (i.e., from about 40.0 mol % to about 49.5 mol %) (with reference to the total of main components, the same applies hereinafter), and is more preferably about 45.0 mol % or more and about 49.5 mol % or less (i.e., from about 45.0 mol % to about 49.5 mol %).

In the sintered ferrite described above, the Zn content based on ZnO is preferably about 5.0 mol % or more and about 35.0 mol % or less (i.e., from about 5.0 mol % to about 35.0 mol %) (with reference to the total of main components, the same applies hereinafter), and is more preferably about 10.0 mol % or more and about 30.0 mol % or less (i.e., from about 10.0 mol % to about 30.0 mol %).

In the sintered ferrite described above, the Cu content based on CuO is preferably about 4.0 mol % or more and about 12.0 mol % or less (i.e., from about 4.0 mol % to about 12.0 mol %) (with reference to the total of main components, the same applies hereinafter), and is more preferably about 7.0 mol % or more and about 10.0 mol % or less (i.e., from about 7.0 mol % to about 10.0 mol %).

The Ni content in the sintered ferrite described above is not particularly limited, and may be the balance of the aforementioned other main components, Fe, Zn, and Cu.

In one embodiment, the sintered ferrite contains about 40.0 mol % or more and about 49.5 mol % or less of Fe (i.e., from about 40.0 mol % to about 49.5 mol %) based on $Fe_2O_3$, about 5.0 mol % or more and about 35.0 mol % or less of Zn (i.e., from about 5.0 mol % to about 35.0 mol %) based on ZnO, about 4.0 mol % or more and about 12.0 mol % of Cu (i.e., from about 4.0 mol % to about 12.0 mol %) based on CuO, and the balance being NiO.

In the present disclosure, the sintered ferrite may further contain additive components. Examples of the additive components for the sintered ferrite include, but are not limited to, Mn, Co, Sn, Bi, and Si. The Mn, Co, Sn, Bi, and Si contents (added amounts) respectively based on $Mn_3O_4$, $Co_3O_4$, $SnO_2$, $Bi_2O_3$, and $SiO_2$ with respect to a total of 100 parts by weight of the main components (Fe (based on $Fe_2O_3$), Zn (based on ZnO), Cu (based on CuO), and Ni (based on NiO)) are each preferably about 0.1 parts by weight or more and about 1 part by weight or less (i.e., from about 0.1 parts by weight to about 1 part by weight). The sintered ferrite may further contain impurities that are unavoidable during the production.

As described above, the coil 7 is constituted by the coil conductor layers 15 electrically connected to one another into a coil shape. The coil conductor layers 15 that are adjacent to each other in the stacking direction are connected to each other through a via conductor that penetrates the insulator portion 6.

The material constituting the coil conductor layers 15 is not particularly limited, and examples thereof include Au, Ag, Cu, Pd, and Ni. The material constituting the coil conductor layers 15 described above is preferably Ag or Cu, and is more preferably Ag. One conductive material or two or more conductive materials may be used.

The via conductor is formed to penetrate through the first insulator layer 11. The material constituting the via conductor can be a material described in relation to the coil conductor layers 15 above. The material constituting the via conductor may be the same as or different from the material constituting the coil conductor layers 15. In a preferred embodiment, the material constituting the via conductor is the same as the material constituting the coil conductor layers 15. In a preferred embodiment, the material constituting the via conductor is Ag.

The coil conductor layer has a pore area ratio of 5% or more and 15% or less (i.e., from 5% to 15%) and preferably 8% or more and 13% or less (i.e., from 8% to 13%). When the pore area ratio of the coil conductor layer is within the aforementioned range, the internal stress is alleviated, and cracking and the like can be suppressed.

The average pore diameter of the coil conductor layer is preferably about 0.1 μm or more and about 6.0 μm or less (i.e., from about 0.1 μm to about 6.0 μm) and more preferably about 0.5 μm or more and about 5.0 μm or less (i.e., from about 0.5 μm to about 5.0 μm). When the average pore diameter of the coil conductor layer is within the aforementioned range, the internal stress is alleviated, and cracking and the like can be suppressed.

The coil conductor layer is formed of a material that has a firing shrinkage ratio of preferably about 15% or more and about 20% or less (i.e., from about 15% to about 20%).

In a preferred embodiment, at least a winding portion of the coil conductor layer 15 (in other words, the portion other than the extended portion 18) has the aforementioned pore area ratio and/or average pore diameter.

In the coil 7 described above, the thickness of the coil conductor layer 15 in the extended portion 18 is larger than the thickness of the coil conductor layer 15 in the winding portion. When the thickness of the coil conductor layer is larger in the extended portion, adhesion between the coil conductor layer in the extended portion and the insulator portion improves.

In this embodiment, in the coil conductor layer 15 in the extended portion of the coil 7, a high pore area ratio layer 20 having the aforementioned pore area ratio and a low pore area ratio layer 19 having a pore area ratio smaller than that of the high pore area ratio layer 20 are stacked. When a low pore area ratio layer having a small pore area ratio is stacked in the extended portion, shrinkage during firing is suppressed, occurrence of voids between the coil conductor layer in the extended portion and the insulator portion is suppressed, and thus adhesion between the coil conductor layer in the extended portion and the insulator portion is improved.

Meanwhile, the coil conductor layers 15 in the winding portion of the coil 7 can be high pore area ratio layers having a relatively large firing shrinkage ratio. When the coil conductor layers 15 in the winding portion are high pore area ratio layers having a relatively large firing shrinkage ratio, the internal stress during firing can be alleviated, and the void portion 21 that serves as a stress-alleviating space can be formed with higher certainty.

The pore area ratio of the low pore area ratio layer 19 is 1.0% or more and 4.0% or less (i.e., from 1.0% to 4.0%) and preferably about 2% or more and about 3% or less (i.e., from 2% to about 3%). When the pore area ratio of the low pore area ratio layer 19 is within the aforementioned range, occurrence of a void between the coil conductor layer in the extended portion and the insulator portion can be suppressed.

The average pore diameter of the low pore area ratio layer is preferably about 0.1 μm or more and about 5.0 μm or less (i.e., from about 0.1 μm to about 5.0 μm) and more preferably about 0.1 μm or more and about 3.0 μm or less (i.e., from about 0.1 μm to about 3.0 μm).

In one embodiment, the low pore area ratio layer 19 is formed of a material having a firing shrinkage ratio of preferably about 5% or more and about 15% or less (i.e., from about 5% to about 15%).

In the extended portion 18, the ratio of the thickness of the low pore area ratio layer 19 to the thickness of the high pore area ratio layer 20 (low pore area ratio layer/high pore area ratio layer) is preferably about 0.2 or more and about 1.8 or less (i.e., from about 0.2 to about 1.8) and more preferably about 0.2 or more and about 0.8 or less (i.e., from about 0.2 to about 0.8).

The void portion 21 serves as what is known as a stress-alleviating space.

The thickness of the void portion 21 is preferably about 1 μm or more and about 30 μm or less (i.e., from about 1 μm to about 30 μm) and more preferably about 5 μm or more and about 15 μm or less (i.e., from about 5 μm to about 15 μm).

The width and the thickness of the void portions can be measured as follows.

A chip is polished with the LT surface of the chip facing an abrasive paper, and polishing is stopped at the W-dimension center portion in the coil conductor layer. Then the chip is observed with a microscope. The void width and thickness at the L-dimension center portion in the coil conductor layer are measured by using the measuring function of the microscope.

In a preferred embodiment, in a cross section perpendicular to the coil winding direction, the void portion has one surface in contact with the insulator portion and the rest in contact with the coil conductor layer. That is, as illustrated in FIG. 2, the first void portion 21 has one surface in contact with the first insulator layer 11 and other surfaces in contact with the coil conductor layer 15. In other words, the void portion 21 on the first insulator layer 11 is covered by the coil conductor layer 15.

The outer electrodes 4 and 5 are disposed to cover the two end surfaces of the element body 2. The outer electrodes 4 and 5 are preferably formed of a conductive material, and preferably, at least one metal material selected from Au, Ag, Pd, Ni, Sn, and Cu.

The outer electrodes may each be a single layer or may be multilayered. In one embodiment, each of the outer electrodes is multilayered and is preferably formed of two or more and four or less layers, for example, three layers.

In one embodiment, the outer electrodes are multilayered and can each include a Ag- or Pd-containing layer, a Ni-containing layer, or a Sn-containing layer. In a preferred embodiment, the outer electrodes each include a Ag- or Pd-containing layer, a Ni-containing layer, and a Sn-containing layer. Preferably, the aforementioned layers are arranged in the order of, from the coil conductor layer side, a Ag- or Pd-containing layer or preferably a Ag-containing layer, a Ni-containing layer, and a Sn-containing layer. Preferably, the Ag- or Pd-containing layer is a layer obtained by baking a Ag paste or Pd paste, and the Ni-containing layer and the Sn-containing layer can be plating layers.

The multilayer coil component of the present disclosure preferably has a length of about 0.4 mm or more and about 3.2 mm or less (i.e., from about 0.4 mm to about 3.2 mm), a width of about 0.2 mm or more and about 2.5 mm or less (i.e., from about 0.2 mm to about 2.5 mm), and a height of about 0.2 mm or more and about 2.0 mm or less (i.e., from about 0.2 mm to about 2.0 mm), and more preferably has a length of about 0.6 mm or more and about 2.0 mm or less (i.e., from about 0.6 mm to about 2.0 mm), a width of about 0.3 mm or more and about 1.3 mm or less (i.e., from about 0.3 mm to about 1.3 mm), and a height of about 0.3 mm or more and about 1.0 mm or less (i.e., from about 0.3 mm to about 1.0 mm).

EXAMPLES

Example

Preparation of Ferrite Paste $Fe_2O_3$, ZnO, CuO, and NiO powders were respectively weighed into 49.0 mol %, 25.0 mol %, 8.0 mol %, and the balance with respect to the total of these powders. The powders were then placed in a ball mill along with PSZ media, pure water, and a dispersant, wet-mixed, pulverized, dried, and calcined at 700° C. to obtain a calcined powder. To the calcined powder, particular amounts a ketone solvent, polyvinyl acetal, and an alkyd plasticizer were added, the resulting mixture was kneaded in a planetary mixer, and then the kneaded mixture was further dispersed with a three-roll mill to prepare a ferrite paste.

Preparation of Ferrite Sheets

The ferrite material was weighed so that the composition thereof was the same as the ferrite paste described above. The weighed material was placed in a ball mill along with PSZ media, pure water, and a dispersant, wet-mixed, pulverized, dried, and calcined at a temperature of 700° C. to obtain a calcined powder. The obtained calcined powder, a polyvinyl butyral organic binder, ethanol, and toluene were placed in a pot mill along with PSZ balls, and were mixed and pulverized. The obtained mixture was formed into sheets by a doctor blade method. As a result, ferrite sheets were prepared.

Preparation of Conductive Paste for Coil Conductor

A particular amount of a silver powder was prepared as a conductive material and was kneaded in a planetary mixer along with eugenol, ethyl cellulose, and a dispersant, and the resulting mixture was dispersed in a three-roll mill to prepare a conductive paste for a coil conductor.

When preparing the conductive paste described above, the PVC was adjusted to prepare two conductive pastes (A) and (B) having different firing shrinkage ratios.

(A) First conductive paste (PVC: 70%, shrinkage ratio: 15% at 800° C.)

(B) Second conductive paste (PVC: 85%, shrinkage ratio: 10% at 800° C.)

Preparation of Resin Paste

Isophorone and an acrylic resin were mixed to prepare a resin paste.

Preparation of Multilayer Coil Component

By using the ferrite sheets, the ferrite paste, the first conductive paste, the second conductive paste, and the resin paste described above, pattern sheets were prepared by the process illustrated in FIGS. 4A to 7E, and the pattern sheets were pressure-bonded to form an assembly, which was a multilayer body block.

Next, the multilayer body block was cut by using a dicer or the like to obtain individual elements. The obtained element was subjected to a barrel process to round the corners of the element. After the barrel process, the element was fired at a temperature of 920° C. to obtain an element body.

Next, an outer electrode-forming Ag paste containing Ag and glass was applied to the end surfaces of the element body and baked to form base electrodes. Next, a Ni coating and a Sn coating were sequentially formed on each of the base electrodes by electrolytic plating so as to form outer electrodes. As a result, a multilayer coil component of Example was obtained.

Comparative Example

A multilayer coil component of Comparative Example was obtained as in Example described above except that a conductive paste having a PVC of 85% was used instead of the first conductive paste.

The samples (multilayer coil components) of Example and Comparative Example both had a length (L) of 1.0 mm, a width (W) of 0.5 mm, and a height (T) of 0.5 mm.

Evaluation

One hundred multilayer coil components of Example and one hundred multilayer coil components of Comparative Example obtained as above were evaluated as to whether there was cracking. The result is shown in the table below. The presence of cracking was confirmed by polishing the LT surface, stopping polishing at about the center portion, and observing the polished surface with a digital microscope.

TABLE

| | Number of cracks |
|---|---|
| Example | 0 |
| Comparative Example | 100 |

A multilayer coil component of the present disclosure can be used in a variety of usages including inductors.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multilayer coil component comprising:

an insulator portion;

a coil that is embedded in the insulator portion and includes a plurality of coil conductor layers electrically connected to one another, conductive portions of the coil conductor layers having a pore area ratio of 5% or more and 15% or less; and outer electrodes that are disposed on surfaces of the insulator portion and are electrically connected to extended portions of the coil, wherein the coil is electrically connected to the outer electrodes through the extended portions, and the extended portions include conductive low pore area ratio layers that have a smaller pore area ratio than the conductive portions of the coil conductor layers.

2. The multilayer coil component according to claim 1, wherein the coil conductor layers have an average pore diameter of from 0.1 μm to 6.0 μm.

3. The multilayer coil component according to claim 1, wherein the low pore area ratio layers have a pore area ratio of from 1.0% to 4.0%.

4. The multilayer coil component according to claim 1, wherein a void portion is formed between each of the coil conductor layers and the insulator portion.

5. The multilayer coil component according to claim 4, wherein in a cross section perpendicular to a coil winding direction, the void portion has one surface in contact with the insulator portion and the rest in contact with the coil conductor layer.

6. The multilayer coil component according to claim 2, wherein the coil has the extended portions and is electrically connected to the outer electrodes through the extended portions, and the extended portions include low pore area ratio layers that have a smaller pore area ratio than the coil conductor layers.

7. The multilayer coil component according to claim 2, wherein the low pore area ratio layers have a pore area ratio of from 1.0% to 4.0%.

8. The multilayer coil component according to claim 2, wherein a void portion is formed between each of the coil conductor layers and the insulator portion.

9. The multilayer coil component according to claim 3, wherein a void portion is formed between each of the coil conductor layers and the insulator portion.

* * * * *